United States Patent [19]
Crawford et al.

[11] Patent Number: 5,926,969
[45] Date of Patent: Jul. 27, 1999

[54] METHOD AND APPARATUS FOR REGENERATING A MOIST ABSORPTION MEDIUM

[75] Inventors: Robert R. Crawford; Donald D. Rainville, both of Stafford; Christopher J. Selley, Oakton, all of Va.

[73] Assignee: Universal Dynamics, Inc., Woodbridge, Va.

[21] Appl. No.: 08/874,654

[22] Filed: Jun. 13, 1997

[51] Int. Cl.[6] ................................................. F26B 21/06
[52] U.S. Cl. ................................................. 34/80; 34/473
[58] Field of Search ................................ 34/80, 81, 378, 34/472, 473, 474

[56] References Cited

U.S. PATENT DOCUMENTS

| | | | |
|---|---|---|---|
| 1,872,783 | 8/1932 | Miller | 96/115 |
| 2,344,384 | 3/1944 | Altenkirch | 96/115 |
| 2,790,505 | 4/1957 | Dow | 95/124 |
| 4,424,857 | 1/1984 | Linde | 165/7 |
| 4,601,114 | 7/1986 | Noguchi | 34/473 |
| 4,761,968 | 8/1988 | Basseen et al. | 62/271 |
| 4,948,391 | 8/1990 | Noguchi | 95/98 |
| 5,406,790 | 4/1995 | Hirota et al. | 60/276 |
| 5,448,895 | 9/1995 | Coelliner et al. | 62/94 |
| 5,485,686 | 1/1996 | Sears, Jr. | 34/473 |

FOREIGN PATENT DOCUMENTS 0 332 724   9/1989   European Pat. Off. .

*Primary Examiner*—Henry Bennett
*Assistant Examiner*—Pamela A. Wilson
*Attorney, Agent, or Firm*—Evenson, McKeown, Edwards & Lenahan, P.L.L.C.

[57] ABSTRACT

A method and an apparatus for regenerating a moist adsorption medium in a multiple vessel drying system utilize a pulsed control of a purge gas outlet valve during a regeneration phase. Internal heaters are embedded in the desiccant beds. During the regeneration phase of a desiccant bed, the internal heater heats the desiccant to remove the moisture therefrom in the form of water vapor. After the water vapor builds up in the drying vessel for a certain period of time, the purge gas outlet valve is opened for a period of time just long enough to flush the built up water vapor from the vessel, and is then closed again. Accordingly, the amount of purge gas required is minimized, which leads to a higher quality purge, higher overall system drying efficiency, as well as reduced energy requirements.

16 Claims, 2 Drawing Sheets

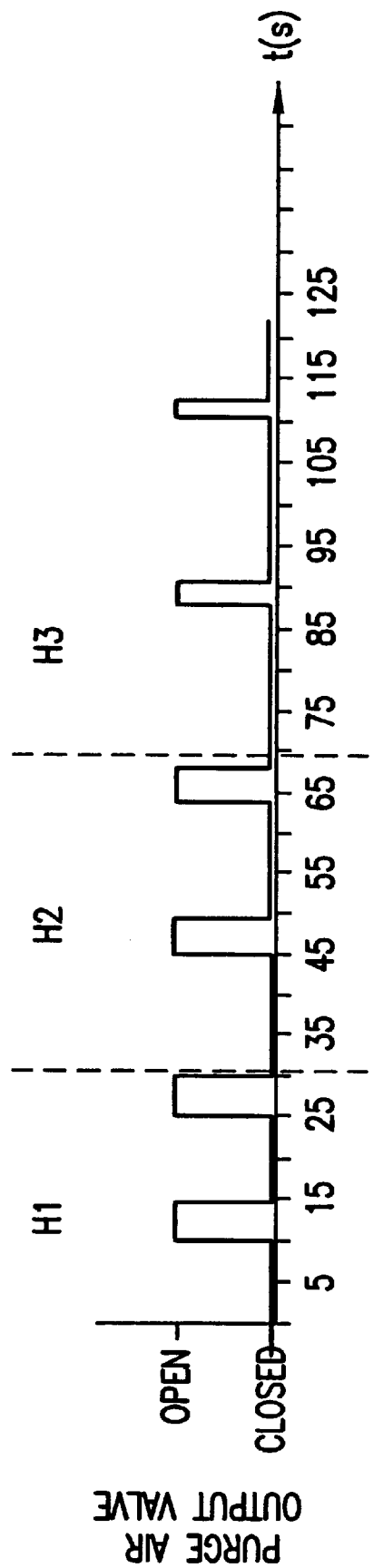

METHOD AND APPARATUS FOR REGENERATING A MOIST ABSORPTION MEDIUM

BACKGROUND OF THE INVENTION

This invention relates to a method for regenerating a moist adsorption medium, particularly an adsorption medium in a multiple bed drying system. The invention further relates to an apparatus for carrying out the method of the invention.

A multiple desiccant bed system used for drying a synthetic plastic material is known, for example, from Noguchi, U.S. Pat. No. 4,601,114, the entire disclosure of which is expressly incorporated by reference herein.

A moisture-laden gas stream is formed as the exit gas from a hopper in which plastic granules are dried by a stream of drying air. The exit gas is conducted through one or more drying vessels filled with an adsorption medium, whereby the adsorption medium extracts the moisture from the gas so that the resulting dry gas can be used again as a drying gas for drying plastic granules.

When the adsorption medium in a drying vessel is saturated with moisture, the drying vessel is transferred to a regeneration phase in which heated outside air is conducted through the adsorption medium which takes up and carries away the moisture which was adsorbed therein. The outside air used to dry the adsorption medium typically contains moisture, which increases the drying time required to regenerate the adsorption medium.

SUMMARY OF THE INVENTION

An object of the invention is to provide an improved method and apparatus for regenerating a moist adsorption medium.

A further object of the invention is to provide a method and apparatus which controls and limits the flow of purge air during the regeneration phase of a drying vessel.

These and other objects of the invention have been achieved according to the present invention by providing a method for regenerating an adsorption medium in a multiple vessel drying system, comprising: introducing a purge gas into a drying vessel containing an at least partially saturated adsorption medium, said drying vessel being selectively communicable with an ambient atmosphere via a purge gas output valve; and controlling said purge gas output valve to be opened and closed a plurality of times during a regeneration phase of said drying vessel.

In accordance with a further aspect of the invention, the objects have been achieved by providing an apparatus for regenerating an adsorption medium in a multiple vessel drying system, comprising: at least two drying vessels, each of said drying vessels containing an adsorption medium; a purge gas output valve for each of said drying vessels, respectively, said purge gas output valves being selectively operable to communicate the drying vessels with an ambient atmosphere; and means for controlling said purge gas output valves such that during a regeneration phase of one of the drying vessels, a respective of the purge gas output valves is opened and closed a plurality of times.

The method and apparatus of the present invention advantageously minimize the amount of purge air required to demoisturize a desiccant bed during a regeneration phase. This is accomplished by providing a separate purge gas output valve which is controlled to repetitively open and close during the regeneration phase. By utilizing an internal heater in the drying vessel, moisture can be desorbed from the desiccant bed without a constant airflow through the vessel. The internal heater heats the desiccant bed during the regeneration phase, causing water vapor to be emitted therefrom. While operating in the regeneration phase with the purge gas output valve closed, the water vapor gradually builds up over time inside the drying vessel as it is released from the desiccant bed. After the water vapor has built up in the vessel, the purge gas output valve is opened for a period of time, preferably only long enough to flush the water vapor out of the drying vessel into the ambient atmosphere, and is then closed again. Throughout the regeneration phase, the purge gas output valve is repetitively pulsed open and closed in order to flush the water vapor released from the desiccant bed.

The present invention advantageously improves the efficiency of the regeneration phase, since only the minimum amount of purge air is used. Accordingly, the amount of heat energy required for regeneration is substantially reduced, since less heat energy is lost when the smaller amount of purge air is flushed from the drying vessel. As compared to prior art systems which utilize a constant purge airflow throughout the regeneration phase, the energy requirements for moving the air through the system are advantageously reduced by minimizing the amount of purge air.

According to certain preferred embodiments, the purge air for drying a moist desiccant bed in one drying vessel during a regeneration phase is drawn from the dried process air exiting another drying vessel which is operating in an adsorption phase. This improves the efficiency of the purge cycle, reducing the purge time since the purge air is dry, and improves the dewpoint performance of the dried vessel. In this case, the minimization of the amount of purge air advantageously improves the drying efficiency of the adsorption vessel, since less dried process air is bled off therefrom.

Although using the dried process air from another drying vessel as the purge air has clear advantages, the present invention also contemplates using another source of purge air, such as moist process air exiting a drying hopper, the ambient atmosphere, or any other source of air. Accordingly, it should be clearly understood that the present invention is not limited to using dried process air as purge air. In a case where moist purge air is used, the minimization of the amount of purge air will improve the efficiency and quality of the regeneration phase, since less moist purge air will be drawn into the drying vessel.

The opening and closing cycle times of the purge air outlet valve are determined experimentally, depending upon relevant system parameters such as the size and type of desiccant bed, airflow rates, as well as desired operating parameters, such as desired dewpoint performance of the system. As an example, the purge air outlet valve may be open within the range of 2–5 seconds, and closed within the range of 10–20 seconds. The opening and closing cycle times may be constant throughout the regeneration phase (e.g., a continuously repetitive cycle of closed 15 seconds, open 4 seconds). Alternatively, the opening and closing cycle times may be varied throughout the regeneration phase, for example as a function of a measured temperature, humidity, or on the basis of time.

According to certain preferred embodiments, the opening and closing cycle times are determined as a function of internal desiccant bed temperatures, which can be measured by a thermocouple mounted in the desiccant bed. Accordingly, a programmable logic controller is programmed to control the opening and closing cycle times based upon a signal received from the thermocouple.

According to other preferred embodiments, the opening and closing of the purge air outlet valve may be triggered by a humidity level measured in the drying vessel being regenerated. During the regeneration phase, the heated water vapor which escapes from the desiccant rises. Therefore, when the purge air outlet valve is closed, the water vapor builds up inside the vessel essentially from the upper end toward the lower end. Therefore, it is contemplated to mount a water vapor sensor proximate a lower end of the drying vessel. When the water vapor builds up enough in the drying vessel such that it exceeds a predetermined level at the lower water vapor sensor, the purge air outlet valve is opened to flush the water vapor out of the vessel. Optionally, a second water vat) or sensor may be mounted proximate an upper end of the drying vessel to control the closing of the purge air outlet valve. After the purge air outlet valve has been opened to flush the water vapor, when the upper water vapor sensor senses a level below a predetermined level, the purge air outlet valve is again closed.

BRIEF DESCRIPTION OF THE DRAWINGS

The invention will be described in further detail hereinafter with reference to preferred embodiments illustrated in the accompanying drawings in which:

FIG. 2 shows a graph of examples of various time cycles of a purge air output valve during a regeneration phase.

DETAILED DESCRIPTION OF PREFERRED EMBODIMENTS

Figure 1:
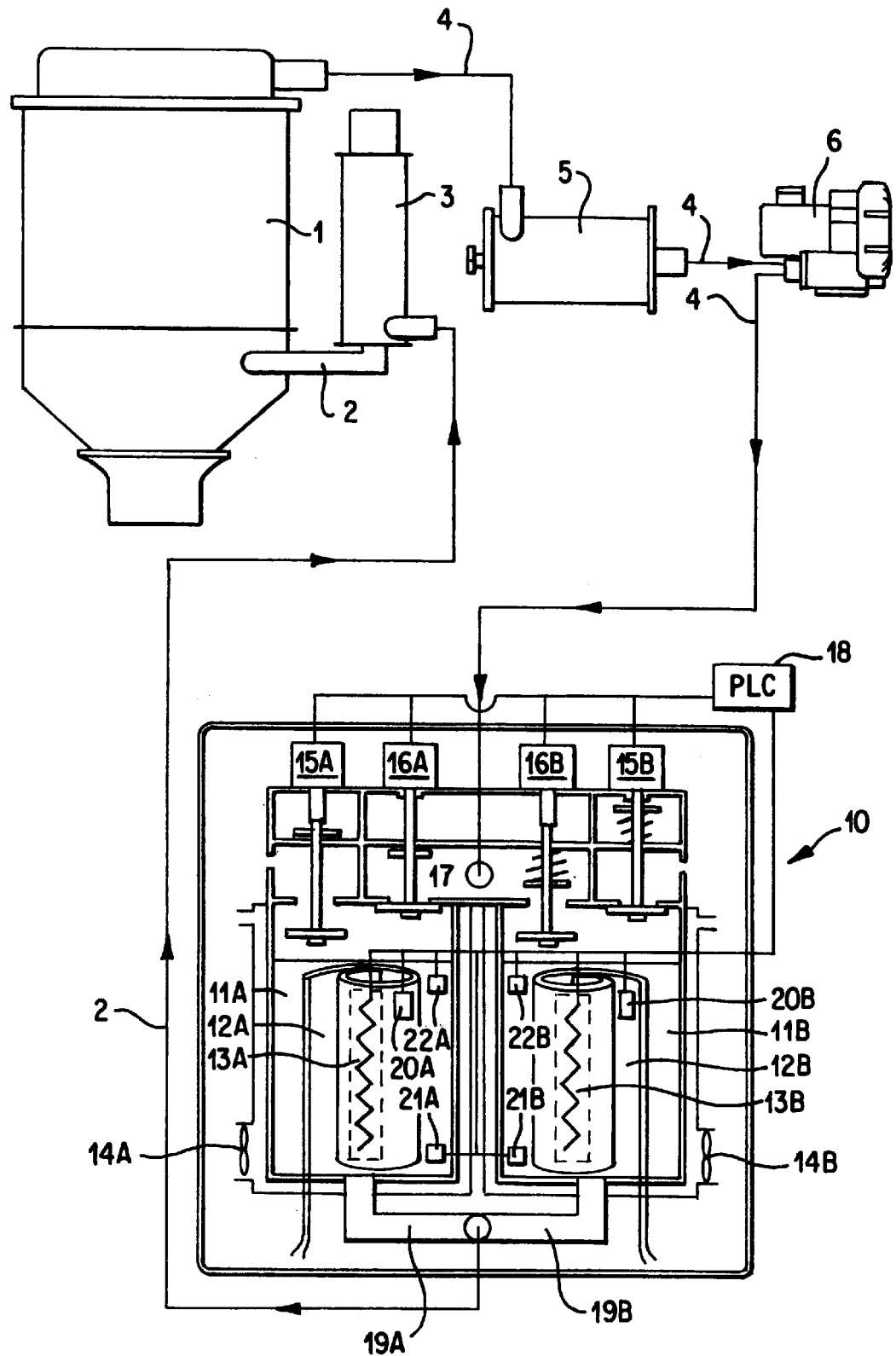
FIG. 1 is a schematic view of an apparatus for regenerating a moist adsorption medium according to one preferred embodiment.

Referring to FIG. 1, a drying system 10 is communicated with a drying hopper 1 which contains a material to be dried, for example, plastic pellets. Dry process air exiting the drying system 10 is fed to the drying hopper 1 via a dry process air line 2. A heater 3 is disposed in dry process air line 2 to heat the process air to a desired temperature. After the process air has entered the drying hopper 1, it is drawn upwardly through the material to be dried, picking up moisture from the material. The moist process air exits the drying hopper 1 and is returned via moist process air line 4 to the drying system 10 to be dried. A filter 5 is disposed in moist process air line 4 to remove contaminants. A blower 6 is disposed in moist process air line 4 to move the process air through the entire system.

The drying system 10 includes a first drying vessel 11A and a second drying vessel 11B. The first drying vessel 11A has a desiccant bed 12A containing an adsorption medium, with an internal heater 13A embedded therein. Likewise, the second drying vessel 11B has a desiccant bed 12B containing an adsorption medium, with an internal heater 13B embedded therein. Each of the drying vessels 11A, 11B has a respective cooling fan 14A, 14B mounted externally of the vessel and directed to blow ambient air at the external surface of the vessel.

The first drying vessel 11A includes a purge air outlet valve 15A and a moist process air inlet valve 16A. Likewise, the second drying vessel 11B includes a purge air outlet valve 15B and a moist process air inlet valve 16B. The purge air-outlet valves 15A, 15B can be selectively opened to communicate the respective drying vessel 11A, 11B with the ambient atmosphere. The moist process air inlet valves 16A, 16B can be selectively opened to communicated the respective drying vessel 11A, 11B with a moist process air intake chamber 17 which is connected with the moist process air line 4 coming from the drying hopper. The valves 15A, 16A, 15B, 16B are poppet-type valves, which allow repetitive pulsing movement between open and closed positions with a minimum of valve wear. The valves 15A, 16A, 15B, 16B are controlled by a programmable logic controller 18.

Each drying vessel 11A, 11B includes a line 19A, 19B at a lower end thereof, the lines 19A, 19B being connected with each other and communicating with the dry process air line 2 leading to the drying hopper.

Each of the drying vessels may be operated in each of an adsorption phase and a regeneration phase. During the adsorption phase, the vessel is connected via the valves in a circuit with the drying hopper to adsorb moisture from the moist process air in the desiccant bed, with the dried process air being returned to the drying hopper. During the regeneration phase, the vessel is disconnected via the valves from the circuit with the drying hopper and the desiccant bed is heated with the internal heater to remove moisture therefrom in the form of water vapor, which is expelled to the atmosphere by flushing the vessel with purge air. During the drying process, the drying vessels are generally used alternately, with one drying vessel in the adsorption phase while the other drying vessel is in the regeneration phase. This allows the material in the drying hopper to be dried without interruption.

FIG. 1 shows the second drying vessel 11B in the adsorption phase. The moist process air inlet valve 16B is opened by the programmable logic controller 18 to allow moist process air coming from the drying hopper 1 via line 4 and the moist process air intake chamber 17 to enter the vessel. The purge air outlet valve 15B is closed by the programmable logic controller to seal the vessel off from the ambient atmosphere. The internal heater 13B is turned off during the adsorption phase. The moist process air flows through the desiccant bed 12B, where moisture is adsorbed to dry the process air. The dried process air exits the drying vessel 11B via line 19B and is drawn through dry process air line 2 into the drying hopper 1.

FIG. 1 shows the first drying vessel 11A in the regeneration phase. The moist process air inlet valve 16A is closed by the programmable logic controller 18 to prevent moist process air in the moist process air intake chamber 17 from entering the vessel. The internal heater 13B is turned on during the regeneration phase to heat the adsorption medium by conduction, causing the moisture contained therein to be given off as water vapor. Dried process air exiting the second drying vessel 11B via line 19B is drawn into the first drying vessel 11A via line 19A. The purge air outlet valve 15A is controlled by the programmable logic controller 18 to repetitively cycle open and closed throughout the regeneration phase. When the purge air outlet valve 15A is open, the water vapor built up inside the vessel is released to the ambient atmosphere. The internal heaters 13A, 13B are controlled via any controller known in the art, for example, via the programmable logic controller 18.

The opening and closing cycle times of the purge air outlet valve 15A, 15B is determined experimentally, depending upon the size and type of desiccant bed, airflow rates, and desired dewpoint performance. The opening and closing cycle times may be determined as a function of internal desiccant bed temperature, which is measured by a thermocouple 20A, 20B mounted in the desiccant bed 12A, 12B. The thermocouple 20A, 20B is connected to the programmable logic controller 18, which is programmed to control the opening and closing cycle times of the purge air outlet valve 15A, 153 based upon a signal received from the thermocouple.

Alternatively, the opening and closing of the purge air outlet valve may be triggered by a humidity level measured in the drying vessel being regenerated. When the water vapor builds up enough in the drying vessel 11A such that it exceeds a predetermined level at water vapor sensor 21A mounted proximate a lower end of the drying vessel, the purge air outlet valve 15A is opened to flush the water vapor out of the drying vessel. When a second water vapor sensor 22A mounted proximate an upper end of the drying vessel senses a water vapor level below a predetermined level, the purge air outlet valve is closed again. Similarly, drying vessel 11B has a water vapor sensor 21B at a lower end, and a water vapor sensor 22B at an upper end.

In order to prevent water vapor released from the desiccant bed 12A in the regeneration phase from backing up into the dried process air flow from the drying vessel 11B via line 19A, i.e., when the water vapor has filled the drying vessel 11A), it is contemplated to optionally place a valve in line 19A. Such a valve would be controlled essentially simultaneously with the purge air outlet valve 15A, such that the two valves would be closed at the same time to essentially seal the drying vessel 11A for a period of time when the water vapor was building up therein, and then both valves would be opened to allow the dried process air to enter the drying vessel 11A via line 19A to flush the water vapor therefrom to the ambient atmosphere.

FIG. 2 shows an example of the opening and closing cycle times of the purge air output valve during the regeneration phase. During an initial period of time, for example when the desiccant bed has an internal temperature H1, the purge air output valve is repetitively pulsed on a cycle of ten seconds closed, 5 seconds open. During a further period of time, for example when the desiccant bed has an internal temperature H2, the purge air output valve is repetitively pulsed on a cycle of 15 seconds closed, 4 seconds open. During a further period of time, for example when the desiccant bed has an internal temperature H3, the purge air output valve is repetitively pulsed on a cycle of 10 seconds closed, 2 seconds open. This illustration is merely an example and is not intended to be limiting, since opening and closing cycle times of the purge air outlet valve are determined experimentally, depending relevant parameters of the system and the desired performance thereof.

After the desiccant bed 12A has been sufficiently dried in the regeneration phase, the cooling fan 14A is turned on. This reduces the need to use additional purge air to cool the hot desiccant bed. Once the desiccant bed 12A has been sufficiently cooled, it is ready to be switched over to the adsorption phase, by closing the purge air outlet valve 15A and by opening the moist process air inlet valve 16A. Simultaneously, the other desiccant bed 12B is switched from the adsorption phase to the regeneration phase, by closing the moist process air inlet valve 16B. During the transition from the loaded (wet) drying vessel 11A to the regenerated drying vessel 11B in the circuit with the drying hopper, it is preferable if both drying vessels 11A, 11B are operated in parallel for a period of time, e.g. several minutes, by opening both moist process air inlet valves 16A, 16B so that the moist process air flows through both desiccant beds 12A, 12B. This helps limit the dewpoint and temperature disruption of the process air stream during the exchange of the drying vessels since only a portion of the moist process air is passing through the fresh desiccant bed. As a further refinement of such a controlled transition between drying vessels, if the moist process air inlet valves 16A, 16B are incrementally or continuously controllable between an open and a closed position, the moist process air inlet valve 16A of the regenerated drying vessel 11A may be incrementally or gradually opened over a period of several minutes, while the moist process air inlet valve 16B of the loaded drying vessel 11B is simultaneously incrementally or gradually closed over the same period of time.

It is to be clearly understood that the present invention is not limited to a system for drying plastic pellets, but may be used in connection with any adsorption process in which a gas is to be dried.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regenerating a moist adsorption medium in a multiple vessel drying system, comprising:

introducing a purge gas into a drying vessel containing an at least partially saturated adsorption medium, said drying vessel being selectively communicable with an ambient atmosphere via a purge gas output valve; and controlling said purge gas output valve to be opened and closed a plurality of times during a regeneration phase of said drying vessel.

2. A method according to claim 1, further comprising measuring the temperature of the adsorption medium in said drying vessel during said regeneration phase, wherein said purge gas output valve is opened and closed according to predetermined cycle times based on a measured temperature of the adsorption medium.

3. A method according to claim 2, wherein said predetermined cycle times of said purge gas output valve are within ranges of from 2–5 seconds opened, and from 10–20 seconds closed.

4. A method according to claim 1, further comprising heating said adsorption medium during said regeneration phase.

5. A method for regenerating a moist adsorption medium in a multiple vessel drying system, comprising:

introducing a moist gas into a first drying vessel during an adsorption phase of said first drying vessel, said first drying vessel containing an adsorption medium which adsorbs moisture from said moist gas to produce a dried gas exiting the first drying vessel;

communicating at least a portion of said dried gas exiting the first drying vessel with a second drying vessel containing an at least partially saturated adsorption medium, said second drying vessel being selectively communicable with an ambient atmosphere via a purge gas output valve; and controlling said purge gas output valve such that said purge gas output valve is opened and closed a plurality of times during a regeneration phase of said second drying vessel.

6. A method according to claim 5, further comprising measuring the temperature of the adsorption medium in said second drying vessel during said regeneration phase, wherein said purge gas output valve is opened and closed according to predetermined cycle times based on a measured temperature of the adsorption medium.

7. A method according to claim 6, wherein said predetermined cycle times of said purge gas output valve are within ranges of from 2–5 seconds opened, and from 10–20 seconds closed.

8. A method according to claim 5, further comprising heating said adsorption medium during said regeneration phase.

9. An apparatus for regenerating a moist adsorption medium in a multiple vessel drying system, comprising:
- at least two drying vessels, each of said drying vessels containing an adsorption medium;
- a purge gas output valve for each of said drying vessels, respectively, said purge gas output valves being selectively operable to communicate the drying vessels with an ambient atmosphere; and
- means for controlling said purge gas output valves such that during a regeneration phase of one of the drying vessels, a respective one of the purge gas output valves is opened and closed a plurality of times.

10. An apparatus according to claim 9, further comprising means for measuring the temperature of the adsorption medium in said one of the drying vessels, wherein said means for controlling said purge gas output valves opens and closes said respective one of the purge gas output valves according to predetermined cycle times based on a temperature measured by said means for measuring the temperature.

11. An apparatus according to claim 9, wherein said drying vessels include selectively operable internal heaters, respectively, and further comprising means for controlling said internal heaters such that during a regeneration phase of said one of the drying vessels, a respective one of the internal heaters is operated.

12. An apparatus according to claim 9, further comprising a dried gas line for each of said drying vessels, respectively, said dried gas lines being communicated with each other, wherein during said regeneration phase a purge gas is drawn into said one of the drying vessels through a respective one of the dried gas lines from dried gas exiting from another one of said drying vessels which is in an adsorption phase.

13. An apparatus according to claim 9, wherein said purge gas output valves are poppet-type valves.

14. An apparatus for regenerating a moist adsorption medium in a multiple vessel drying system, comprising:
- at least two drying vessels, each of said drying vessels containing an adsorption medium;
- a moist gas input valve for each of said drying vessels, respectively, said moist gas input valves being selectively operable to communicate said drying vessels with a moist gas source;
- a purge gas output valve for each of said drying vessels, respectively, said purge gas output valves being selectively operable to communicate the drying vessels with an ambient atmosphere;
- a dried gas line for each of said drying vessels, respectively, said dried gas lines being communicated with each other; and
- means for controlling said moist gas input valves and said purge gas output valves such that during an adsorption phase of one of the drying vessels, a respective one of the moist gas input valves is opened and a respective one of the purge gas output valves is closed, and such that during a regeneration phase of another one of the drying vessels, a respective one of the moist gas input valves is closed and a respective one of the purge gas output valves is opened and closed a plurality of times.

15. An apparatus according to claim 14, further comprising means for measuring the temperature of the adsorption medium in said another one of the drying vessels, wherein said means for controlling opens and closes the purge gas output valve of said another one of the drying vessels according to predetermined cycle times based on a temperature measured by said means for measuring the temperature.

16. An apparatus according to claim 14, wherein said drying vessels include selectively operable internal heaters, respectively, and further comprising means for controlling said internal heaters such that during a regeneration phase of said one of the drying vessels, a respective one of the internal heaters is operated.

* * * * *